United States Patent [19]
Miree

[11] Patent Number: 5,927,801
[45] Date of Patent: Jul. 27, 1999

[54] AUXILIARY BICYCLE SEAT

[76] Inventor: Mallory F. Miree, Suite 302, 2018 Brookwood Medical Center Dr., Birmingham, Ala. 35209

[21] Appl. No.: 09/024,355

[22] Filed: Feb. 17, 1998

[51] Int. Cl.⁶ .................................................. B60N 2/38
[52] U.S. Cl. ........................................ 297/195.1; 297/243
[58] Field of Search ........................... 297/195.1, 195.13, 297/195.12, 243, 252, 250.1; 280/202; 224/159, 160

[56] References Cited

U.S. PATENT DOCUMENTS

| | | |
|---|---|---|
| 579,514 | 3/1897 | Collins .................................. 297/243 X |
| 2,448,867 | 9/1948 | Darden ..................................... 280/202 |
| 3,902,737 | 9/1975 | Berger . |
| 4,305,532 | 12/1981 | Reminger . |
| 4,632,453 | 12/1986 | Robbin . |
| 4,919,479 | 4/1990 | Loewke . |
| 5,104,188 | 4/1992 | Jefferson . |
| 5,190,306 | 3/1993 | Nauman et al. ..................... 297/243 X |
| 5,330,215 | 7/1994 | Bishaf . |

*Primary Examiner*—Laurie K. Cranmer
*Attorney, Agent, or Firm*—Bradley Arant Rose & White LLP; Thad G. Long; Margaret Smith Kubiszyn

[57] ABSTRACT

An auxiliary bicycle seat is provided which has a seat, a forward brace, and a rear downward bifurcated brace which eliminates lateral instability associated with typical auxiliary seat designs. The rear downward brace straddles an upper horizontal bicycle bar or an auxiliary bar and further mounts securely to the lower structural support bars of a bicycle.

34 Claims, 11 Drawing Sheets

AUXILIARY BICYCLE SEAT

TECHNICAL FIELD

This invention relates generally to bicycles and more particularly to auxiliary seats adapted to be mounted and dismounted on bicycles as for use by small children or other objects accompanying an adolescent or adult.

BACKGROUND OF THE INVENTION

Adult bicycles normally are equipped with a single seat upon which the cyclist may sit while peddling and steering. Often parents wish to have a child accompany them while cycling. Although the parent may strap the child to his or her back in papoose fashion, it is more common to have the child sit on an auxiliary seat that is attached to the bicycle. Such a seat has commonly been mounted over the rear fender with the child's legs straddling the rear wheel. This arrangement, however, has a number of disadvantages. For example, the view for the child is mainly that of the back of the adult rather than the passing scene. Since the child is behind the cyclist, the cyclist must turn around in order to talk with or to check on the child's security. There is also the chance of the child's foot striking the rear wheel. This positioning of the child also moves the center of gravity of the loaded bike so far to the rear as to seriously affect stability. This design is expensive, requires much time and skill as well as a number of tools to attach it. Equally, removal is difficult and time consuming.

For these reasons child seats have more recently been designed to be mounted in front of the cyclist and just behind the head tube and handle bars. This offers much improvement over the rear attached child seats because of the shift of the child's weight from the rear to the center of the bicycle. The major failure of all of the centrally placed child seats invented thus far has been severe inherent design lateral instability. These designs create no reasonable safety for the child and equally increased operational hazards to the cyclist.

Where the cyclist is interested in transporting objects other than a child, the same problems arise as to instability. Notwithstanding the improved results of positioning a load to the center of the bicycle between the seat and head tube, current inventions fail to consider the import of accounting for lateral stability. Examples of such prior designs are shown in U.S. Patents as follows:

In U.S. Pat. No. 3,902,737 entitled CHILD CARRIER AND MOUNTING ASSEMBLY FOR BICYCLE by I. Berger and K. Welter, the child's seat is attached by clamps to the cylindrical head tube (steering column) providing no assured lateral stability. The seat may be allowed to swing outward to the left or right causing improper displacement of weight.

In U.S. Pat. No. 4,305,532 entitled UNIVERSAL BICYCLE CARRIER by J. Reminger, the child's seat is attached to a 4" wide platform that merely sits either on the bicycle's upper structural support tube of a male style bicycle with no attachment, or loosely wedges between the head tube and seat post of a female style bicycle. The wedge in front of the platform that rests against the sides of the head tube is inadequate to provide vertical or rotational stability for the child seat. Moreover, the mechanism suggested for use as foot stirrups has no structural functionality and although its design straddles the upper structural support tube of both a male and female bicycle, it is only resilient wire having flexibility for removable attachment to the seat platform and does not strattle the bicycle's lower structural support bar.

In yet another design, U.S. Pat. No. 4,632,453 entitled AUXILIARY SUPPORT SYSTEM FOR BICYCLE PASSENGER by J. Robbin and J. Robbin, the child's seat attaches to the top tube and has nothing in the design to assure against severe rotational instability. Likewise, the foot clips bar is attached to the head tube. There is no assurance against rotational instability here, either. Moreover, essentially no modem bicycles have an amount of free space around the head tubes necessary to secure such foot clips.

In still another U.S. Pat. No. 4,919,479 entitled APPARATUS. FOR CARRYING A PASSENGER ON A BICYCLE by E. Loewke and D. Loewke, the child's seat rests upon the upper structural support tube and is centrally located. It has one attachment to hold down the forward part of the design but nothing to secure the rear end which loosely straddles the rear post. The latter design is insufficient to prevent lateral wobbling and with one mild-to-moderate bump the rear of the design may well lift away from resting on the upper tube possibly allowing the child to fall to the ground.

In U.S. Pat. No. 5,104,188 entitled BICYCLE SEAT FOR CHILDREN by M. Jefferson, the child's seat rests centrally and around the top tube, secured by one clamp. Like prior designs, inherently this cannot guarantee against rotational instability. Moreover, the vertical brace for use on female style bicycles is designed only to strattle the bicycle's upper structural support tube allowing for inherent lateral instability.

Finally, in U.S. Pat. No. 5,330,215 entitled CENTER-MOUNTED PASSENGER SEAT FOR BICYCLE by M. Bishaf and J. Faulhaber, the child's seat has a rearward attachment by thin rods to the seat post and the forward position merely rests atop the top tube. Not only will the rods be unable to prevent the child's seat from tilting side to side, there is nothing to prevent upward instability of the forward portion of the design.

Accordingly, it is seen that a centrally located auxiliary seat for a bicycle of relatively simple economic construction, yet possessing a high degree of lateral stability, remains in need. It is to the provision of such therefore, that the present invention is directed.

SUMMARY OF THE INVENTION

In a preferred embodiment of the invention, an auxiliary bicycle seat is adapted to be mounted across both the upper and the lower structural support tubes of a bicycle, between the bicycle's seat tube and head tube (steering column). The auxiliary bicycle seat of the current invention comprises a seat support which supports a seat, a forward support brace extending downward from a front portion of the auxiliary seat to the bicycle upper structural tube, and a rear support brace designed as described below. Means are provided for fastening the forward support brace securely to the upper tube. In a preferred embodiment of the invention, the rear support brace comprises forked support rods that extend downward from the seat support to a distance sufficient to straddle both the bicycle's upper and lower structural tubes. Another embodiment contemplates a horizontal brace upon which a child's feet may rest provided together with means for mounting the brace to the rear support rods. The horizontal brace may be attached to the rear support rods either just above or below the lower structural tube to suit the lengths of the legs of the child. Specifically, the higher placement will accommodate children from about 1½–4 years of age, the lower placement will accommodate the length of legs of children from about ages 3–9 years.

Another object of the invention is to provide an auxiliary bicycle seat capable of being semi-permanently mounted to a bicycle.

Another object of the invention is to provide an auxiliary bicycle seat that has lateral structural stability.

Yet another object of the invention is an auxiliary bicycle seat that can be mounted to a multiplicity of bicycle designs including a standard road bicycle (both male and female), a mountain bike, and state of the art single structural tube fiberglass designs as depicted herein (FIGS. 10 to 13).

In one embodiment the invention includes a horizontal stabilizing bar, in addition to the rear forked downward projecting brace, for stabilizing the auxiliary seat on bicycle designs that have either no upper structural bar or that have an upper structural bar that is angled severely from the horizontal from the head tube to the bicycle seat post tube.

Yet another object of the invention is to provide an auxiliary seat that has adjustable foot supports for a child occupant.

Still another object of the invention is to provide an auxiliary seat or platform upon which either animate or inanimate objects may be placed. In this embodiment the auxiliary seat has a bifurcated forward structural support which straddles the upper and lower bicycle structural bars. The bifurcated forward structural support may be connected either to the lower end of the rear structural support or may simply be secured to the upper and lower bicycle bars as is the case with the rear structural support (see FIGS. 18 and 22). This embodiment further may support any number of objects as depicted in the drawings.

Yet another object of the invention is to provide a removable seat platform for either a human to sit upon, as in a typical bicycle seat, or a planar platform for carrying bulky objects.

BRIEF DESCRIPTION OF THE DRAWING

FIG. 6a A front view of the lower tube grip receiving means seat for the adjustable embodiment shown in FIG. 5.

FIG. 6b A top view of the adjustable tube grip seat of FIG. 6a.

FIG. 7 Depicts a vertical side view of the adjustable tube grip seat of FIG. 6a and three embodiments of the tube grip receiving means designed for tubes of varying diameter.

FIG. 8 A front view of one tube grip receiving means showing that the arcuate grip of the tube grip receiving means is angled with respect to the adjustable tube grip seat.

FIGS. 10–13 show side views of the invention mounted to various bicycle designs. Specifically.

DETAILED DESCRIPTION

Figure 1:
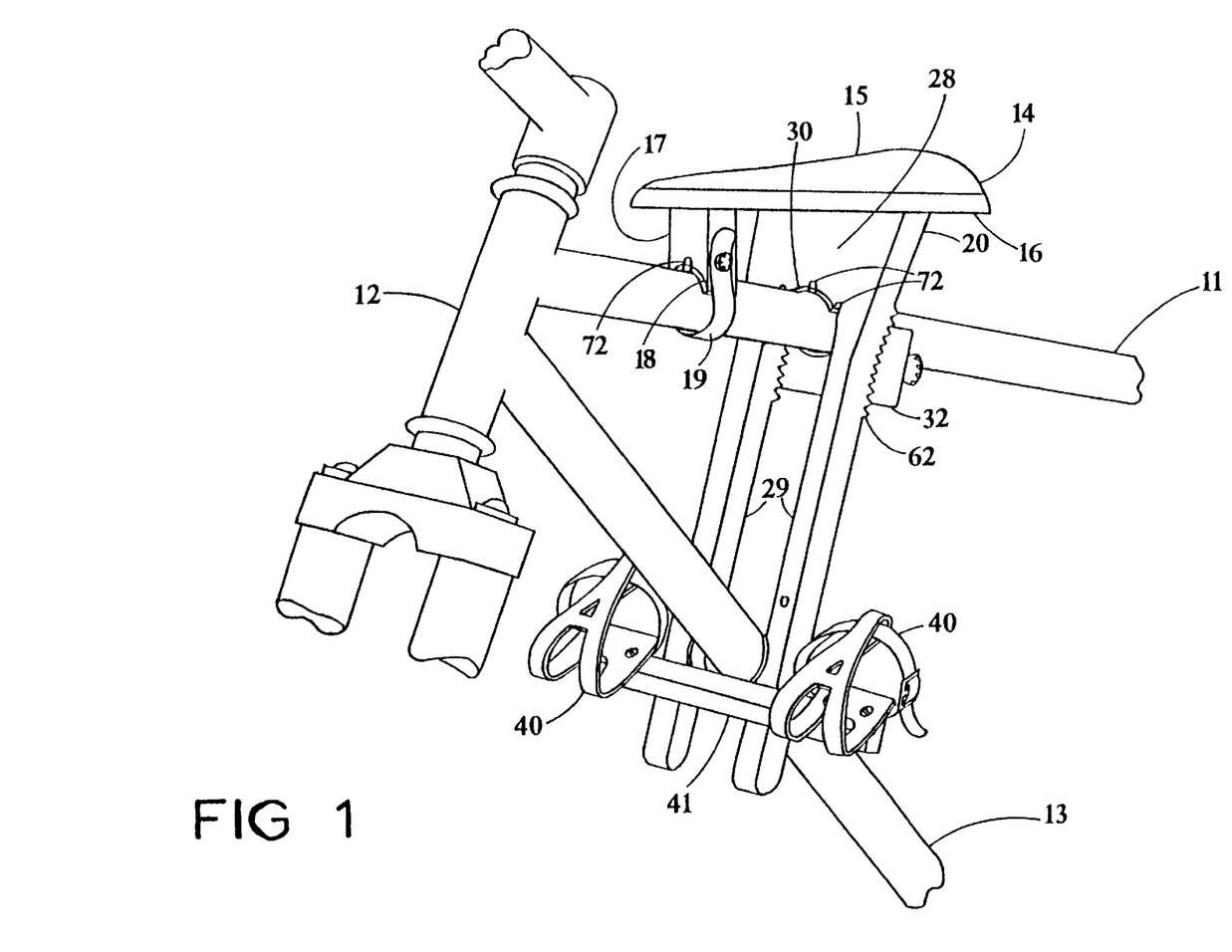
FIG. 1 Frontal perspective view of a mountain bicycle frame with proposed auxiliary seat for a child.
Figure 2:
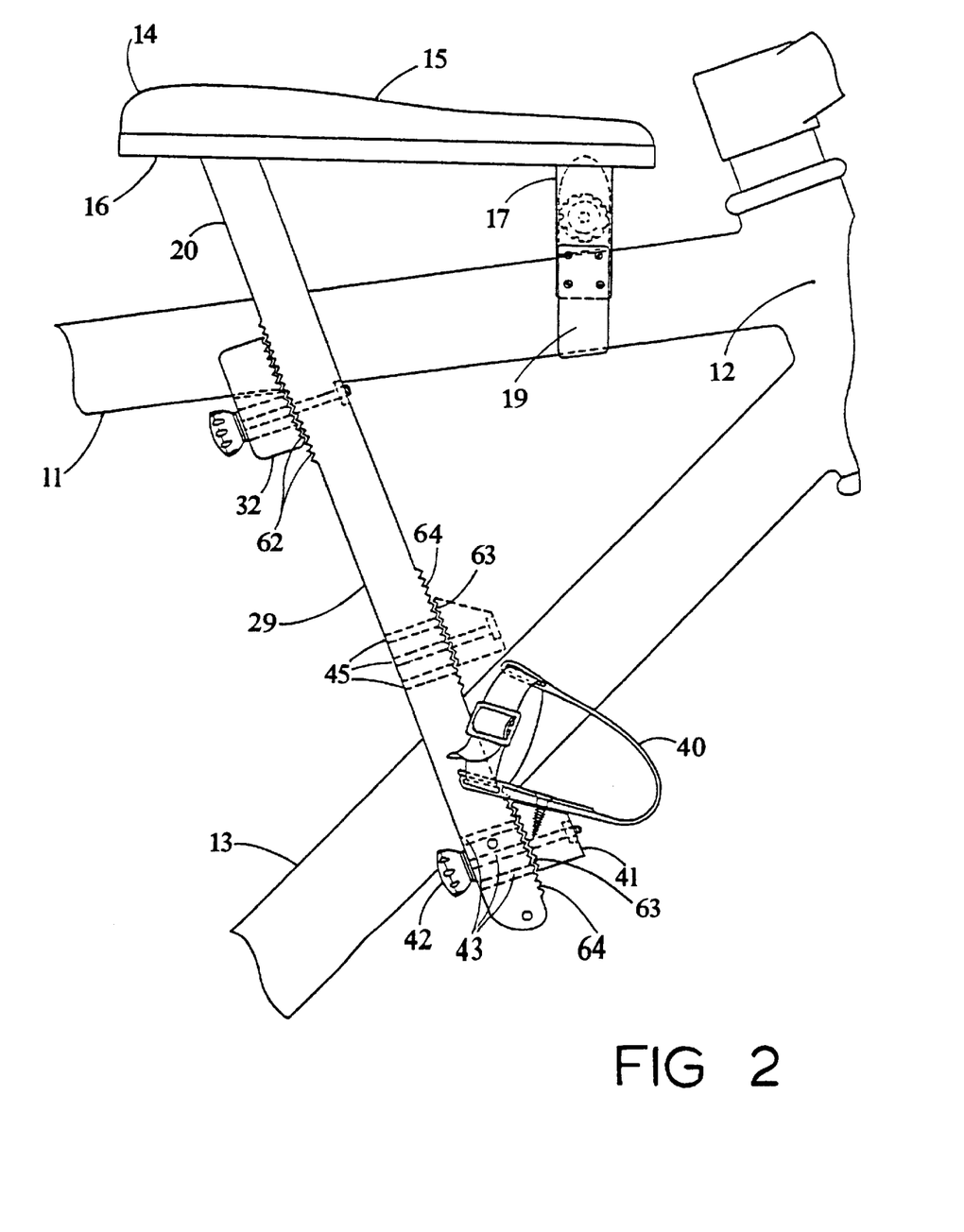
FIG. 2 A side view of one embodiment of the auxiliary seat.

Referring now in more detail to the drawings in FIGS. 1 and 2, there is shown the upper and lower structural support bars of a bicycle having a frame made of cylindrical bars that includes an upper near horizontal top tube 11, which in turn is connected to an upper portion of a head tube 12. A down or lower tube 13 extends rearward and downward from a lower portion of the head tube 12 to a near vertical bicycle seat tube (not shown). The auxiliary seat 14 is constructed so as to have a seat cushion 15 or other seat design mounted to a seat support 16. To the under side of the seat support 16 is connected a forward support brace 17 which is designed so as to have a concave arcuate lower end 18 allowing said support to contact a partial circumference of the upper structural support bar 11 of the bicycle. The forward support brace 17 is further equipped with an attachment means such as strap 19 to stabilize the forward end of the seat in connection with the upper bicycle support bar 11. In a preferred embodiment, the means of said stabilizing attachment is a hook and loop fastener such as a VELCRO strap. Alternatively, said stabilizing attachment of a strap 19 may be by clamps, screws, or other such means commonly understood by those skilled in the art.

Figure 3:
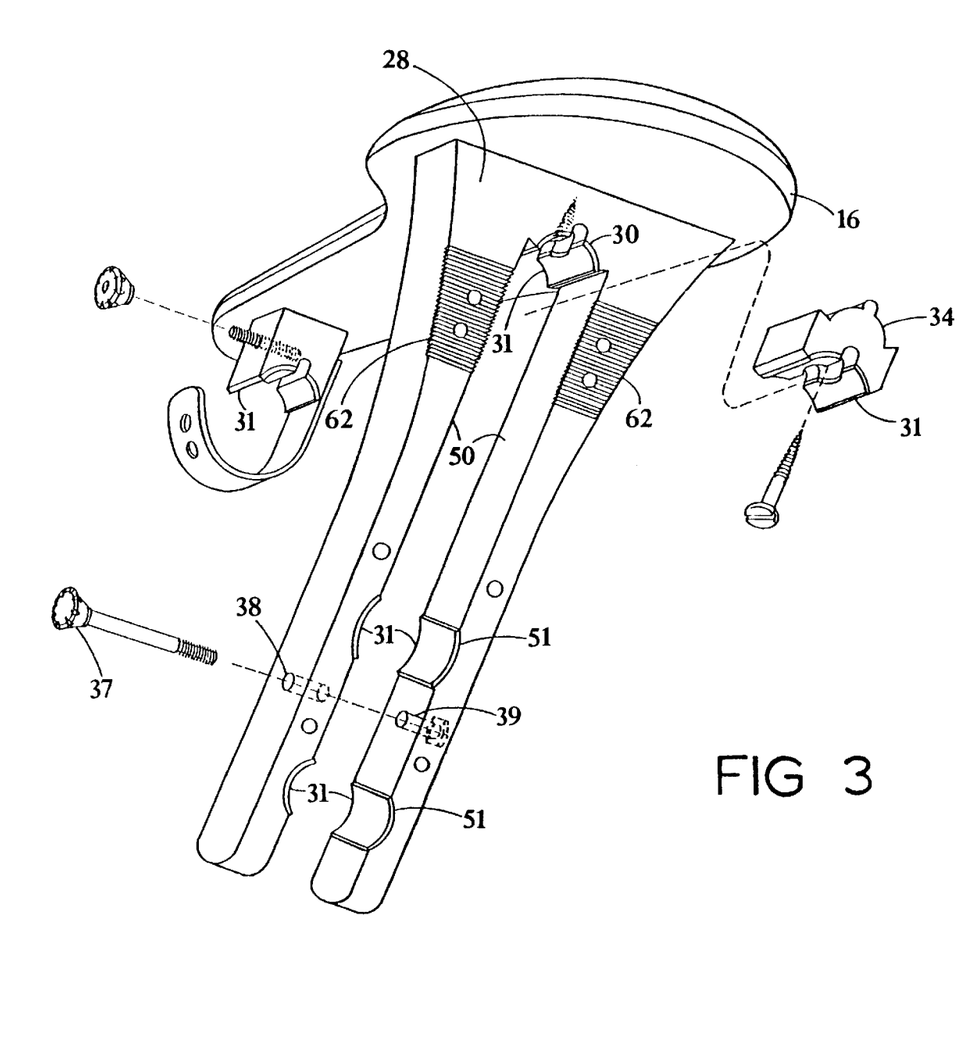
FIG. 3 An exploded rear perspective view of the auxiliary seat showing various elements of the invention.

The rear support brace 20 is of a bifurcated or forked construction and has an upper bridge portion 28 from which two legs 29 descend in side-by-side, spaced relation. The exposed bottom 30 of the bridge portion 28 is arcuately shaped so that it may be mounted flush upon the bicycle's cylindrical upper structural support tube 11. In a preferred embodiment the exposed bottom 30 and the area of the legs adjacent to the exposed bottom 30 are able to accept an insert 34 (see FIG.3) which may be semi permanently attached to the auxiliary seat by any number of attachment means (e.g. a screw, bolt, clamp) so that the auxiliary seat 14 may rest in a horizontal attitude with respect to the ground when used on a bicycle that has an upper support bar that is angled from the horizontal from the head tube to the bicycle seat support tube (as is found on mountain and female bicycles). Additionally, forward support brace 17, exposed bottom 30 and insert 34 may include indentations 72 placed transversely therein to accommodate gear cables which are routinely located longitudinally along either the top or bottom structural support bars of the bicycle.

Figure 4:
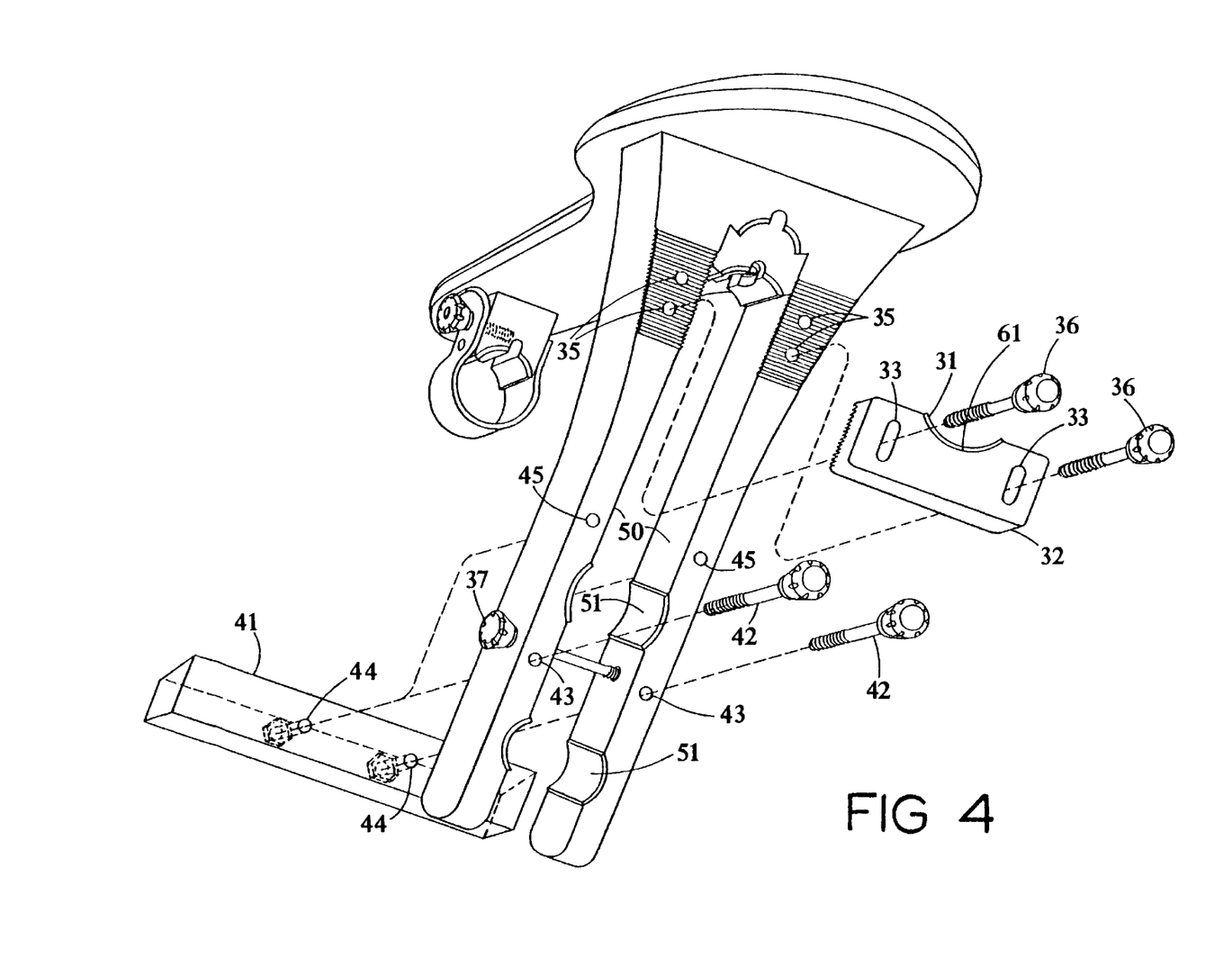
FIG. 4 An exploded rear view showing various elements of the invention.

The two legs 29 extend a distance beyond the bicycle frame lower structural support tube 13. It is the fact that the rear support legs extend downward to a distance below the bicycle's lower structural support bar that provides the current invention with the heretofore unrecognized capacity of lateral stability. The inside facing sections 50 (FIGS. 3 and 4) of the legs 29 near their respective distally located termini are equipped with arcuate lower structural tube receiving means 51 to receive the lower tube snugly. One embodiment of the invention incorporates two such receiving means 51 to accommodate bicycles of various dimensions. The arcuate receiving means 51 may include resilient pads 31 which may be affixed within the arcuate sections of the legs. Resilient pads 31 may also cover the arcuate bottom of the forward support brace 17 and the rear support brace bridge 28. Thus, the forgoing references to flush mountings is intended to include these pads which are functional to protect the bicycle paint and to increase friction between the auxiliary seat and bicycle support tubes.

Figure 5:
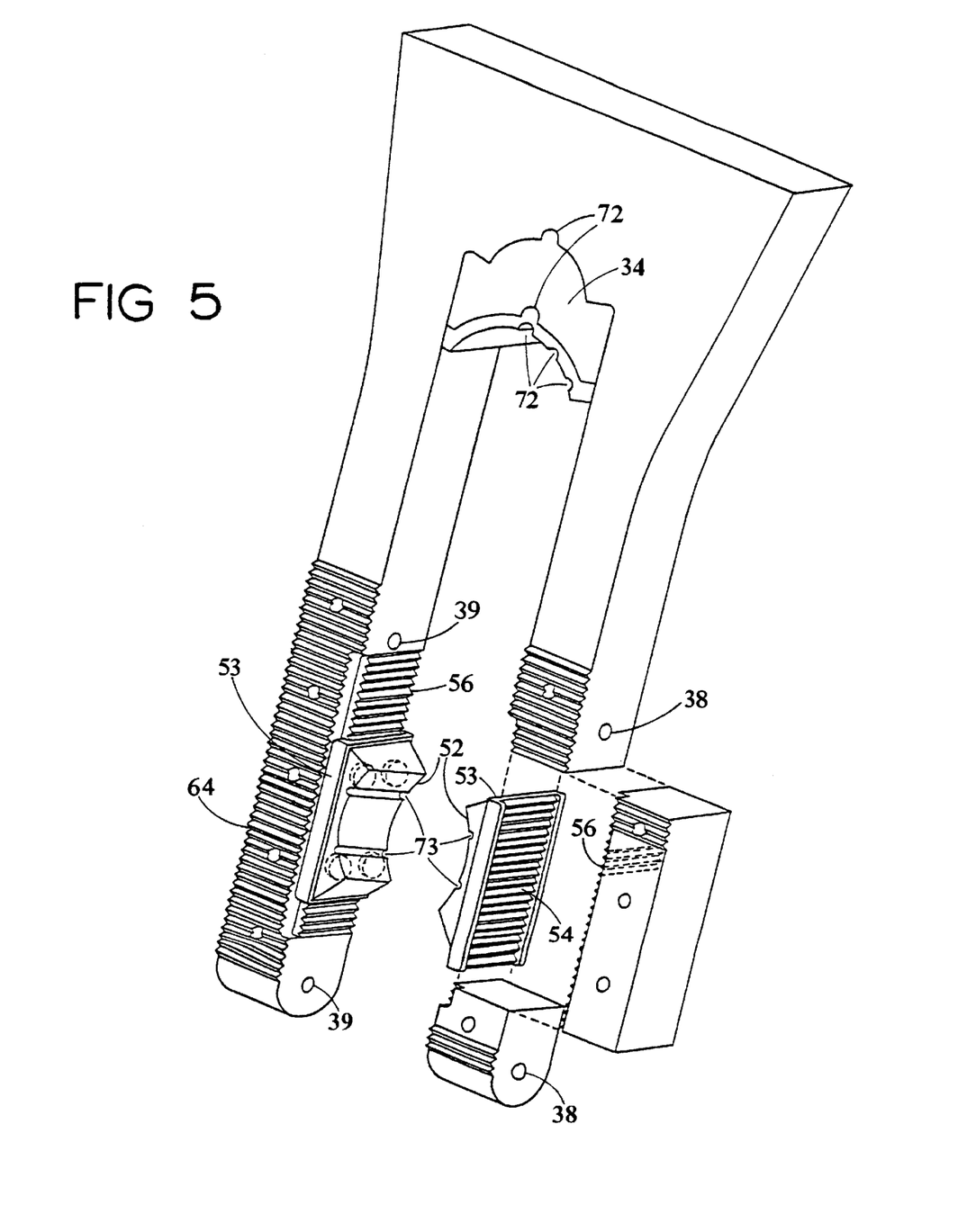
FIG. 5 A frontal perspective of one embodiment of the invention in which the lower tube grip is vertically adjustable.
Figures 6A, 6B, 7, 8:
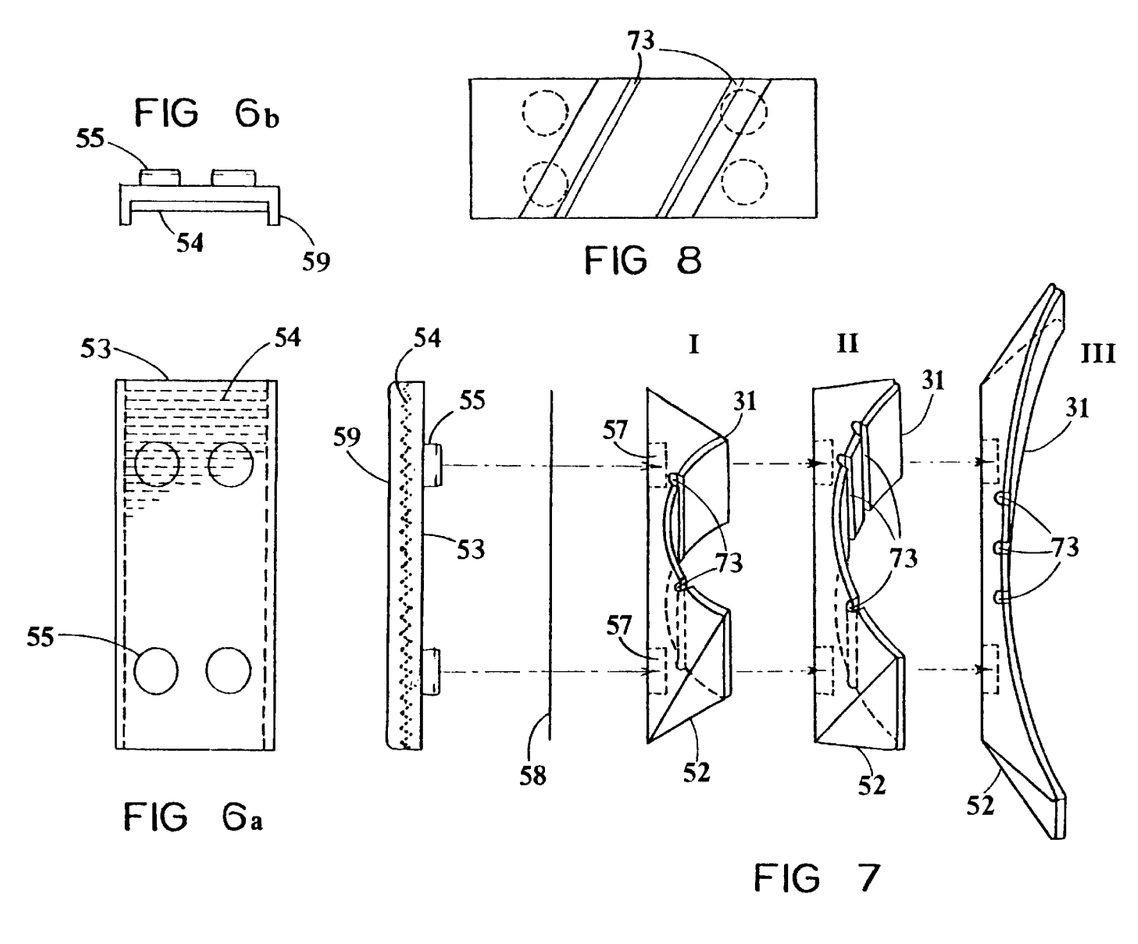

In a preferred embodiment, the lower arcuate receiving means of the rear support brace 29 are vertically adjustable (FIG. 5) so as to easily accommodate any number of bicycle designs as by a ratcheted slide having arcuate receiving means 52 connected thereto. The receiving means 52 may be semi-permanently mounted to seat racks 53 which have a ratcheted rear inner surface 54, receiving means nipples 55, and side flanges 59 which in turn provide a means to keep the seat racks 53 from slipping forward or rearward. The ratcheted surface 54 of seat rack 53 mate with ratchet surface 56 when compressed to eliminate vertical slipping of the arcuate receiving means 52. Receiving means 52 are further designed so as to mate with seat rack 53 by having incorporated into the rear side of the receiving means a multiplicity of nipple receivers 57. Further adhesion of the receiving means and seat racks is provided by double sided sticky tape 58 placed between receiving means 52 and seat rack 53. The receiving means 52 may be made to accommodate bicycles with varying diameter of lower support bars as shown in FIG. 8 examples I, II, and III. In a preferred embodiment, receiving means 52 are made of plastic and have attached to their respective arcuate surfaces resilient pads 31. In another embodiment, receiving means 52 may themselves be resilient such as would occur where they are composed of a resilient plastic.

The rear support legs 29 are secured to the bicycle by a screw 37 (FIGS. 3 and 4) or other such commonly used means to create inward or lateral tension between the legs such that either the fixed 51 or the adjustable 52 arcuate receiving means may contact the bicycle's lower structural support bar in a secure fashion. For example, screw 37 may be directed to pass through channels 38 and into threaded channels 39 located in the support brace legs above and/or both below the bicycle lower structural support tube 13 (see FIGS. 3 and 5).

The auxiliary bicycle seat may also include a cross-brace 32 (FIGS. 2 and 4) having an arcuate portion in it's top surface 61 in which another resilient pad 31 is affixed. The cross-brace has two upright slots 33 and is adapted to be mounted to the rear support brace legs 29 just beneath the bicycle upper structural support tube 11. Cross brace 32 may be removably attached with fasteners 36 comprising such as screws or the like by passing the shanks of said screws through slots 33 and then screwed into threaded channels 35 in the legs 29. The slots 33 thus enable to the cross-brace to be mounted snugly beneath the cylindrical bicycle upper structural support tube of varying diameters, dependent on the brand and style of the particular bicycle to which the auxiliary seat is to be mounted.

In one embodiment of the invention, the rear support legs 29 and cross brace 32 have ratcheted surfaces 62 (FIGS. 1 and 2) to provide a means by which said cross brace 32 may be kept from slipping out of a secured fit.

The auxiliary seat further comprises a pair of stirrups 40 which are mounted atop a cross-bar 41 which is, in turn, removably mounted to the front of the rear support legs 29. The cross-bar 41 may be mounted by any means reasonably understandable by one of ordinary skill, including screws, clamps, etc. The cross-bar 41 may include ratcheted surface 63 along the rearward facing side so as to mate with ratcheted surface 64 of the forward facing surface of rear support legs 29 to aid in preventing slipping of the cross-bar.

The auxiliary seat is readily mounted to the bicycle by straddling the forked rear support brace legs 29 atop the bicycle upper tube 11 close behind the head tube column 12. The forward support brace attachment means, strap 19, is then secured firmly around the upper tube. The cross brace 32 is then mounted to the rear support brace legs 29 beneath the bicycle's upper tube 11 and secured firmly there with fasteners 36. The legs are then secured via the lateral tension means such as bolts 37 such that the adjustable arcuate lower support bar receiving means are positioned adjacent and on either side of the bicycle lower support bar 13.

Finally, the cross-bar 41 with stirrups 40 is mounted to the front of the legs 29 by inserting bolts 42 through channels 43 and into threaded channels 44 (FIG. 4) and tightened firmly. As shown by dotted image in FIG. 2, the cross-bar may be mounted higher up the rear support brace legs 29 using a pair of spaced alternate bolt channels 45 to accommodate a child of smaller stature.

Figure 23A:
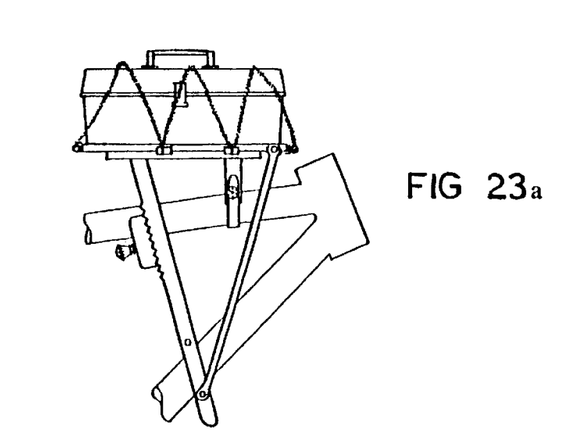
FIGS. 23a and 23b depict uses for the seat support platforms, particularly, use for inanimate objects such as a tool box, or attachment of a toddler seat.
Figure 23B:
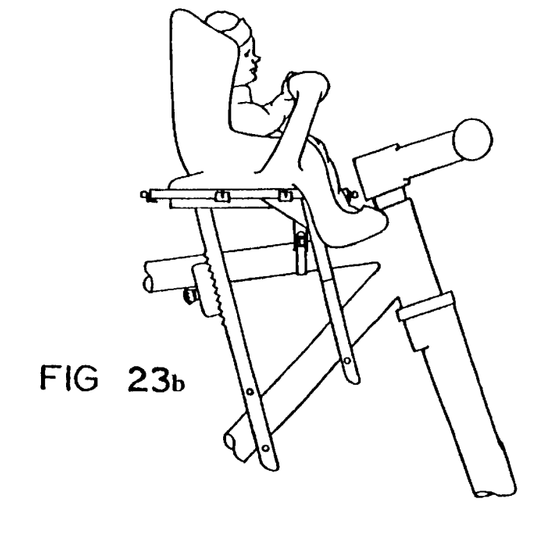

In another embodiment of the invention (FIG. 23b) where a very young child is to occupy the auxiliary seat, no cross-bar is needed. Instead, foot supports may be permanently or removably attached to the seat support 16 or integrally associated with the seat itself.

Figures 9A, 9B:
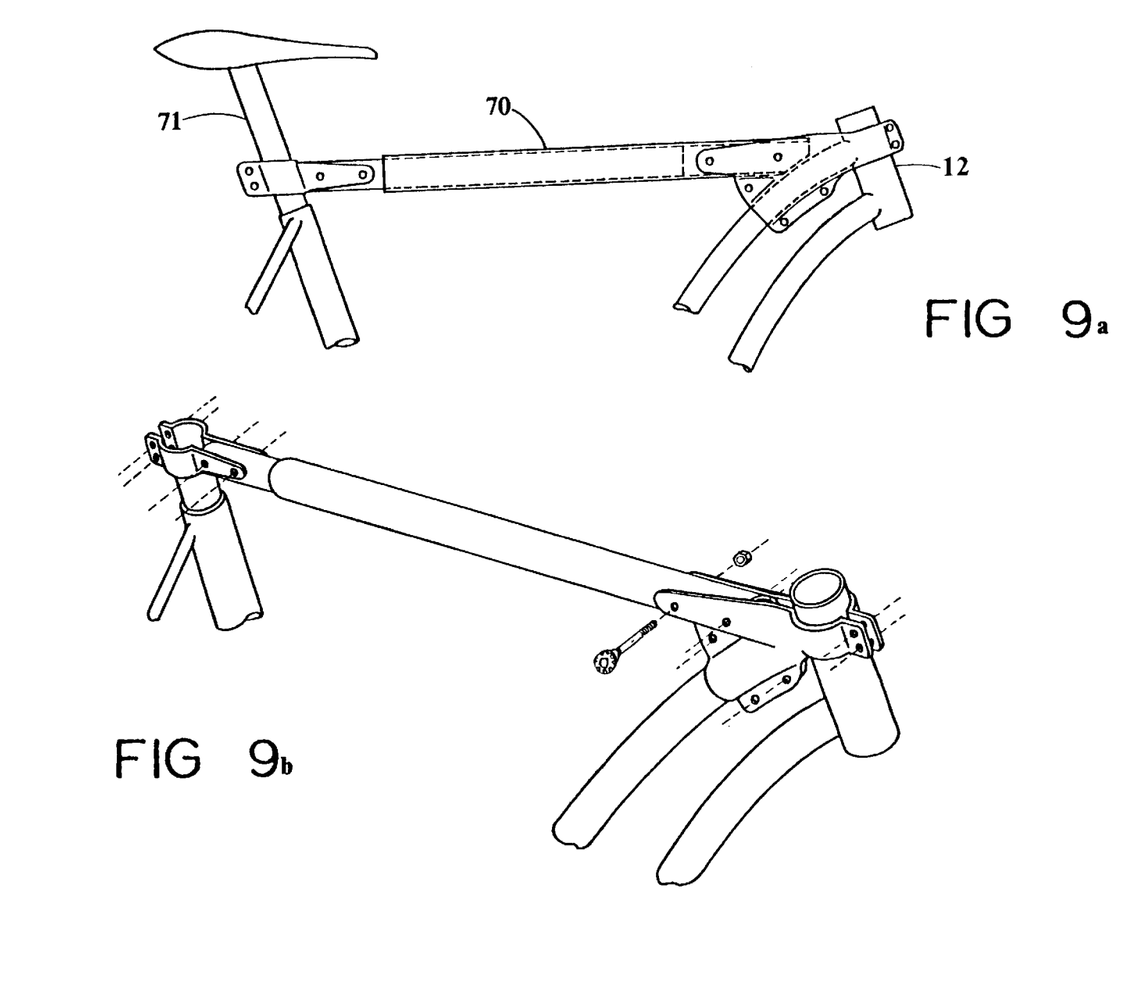
FIGS. 9a and 9b depict auxiliary telescoping horizontal support bar for female and other bicycle designs that have no horizontal upper structural bar.

In yet another embodiment of the invention, where the auxiliary seat is contemplated for use on a woman's style bicycle or other type bicycle having structural support bars which deviate sharply from the horizontal, as shown in FIGS. 9a and 9b, the auxiliary seat may include a telescoping bar 70 which may be first mounted upon the bicycle by attaching said telescoping bar securely to the head tube 12 and seat post 71 in a horizontal fashion. The auxiliary seat may then be secured to the bicycle as described above.

In yet another embodiment of the invention, the auxiliary seat provides for the presence of gear cables which routinely are associated with the upper and/or lower bicycle structural support bars. For example, insert 34 may include notches 72 (FIG. 5) while arcuate receiving means 52 (FIG. 7) may have cable channels 73.

Figure 10:
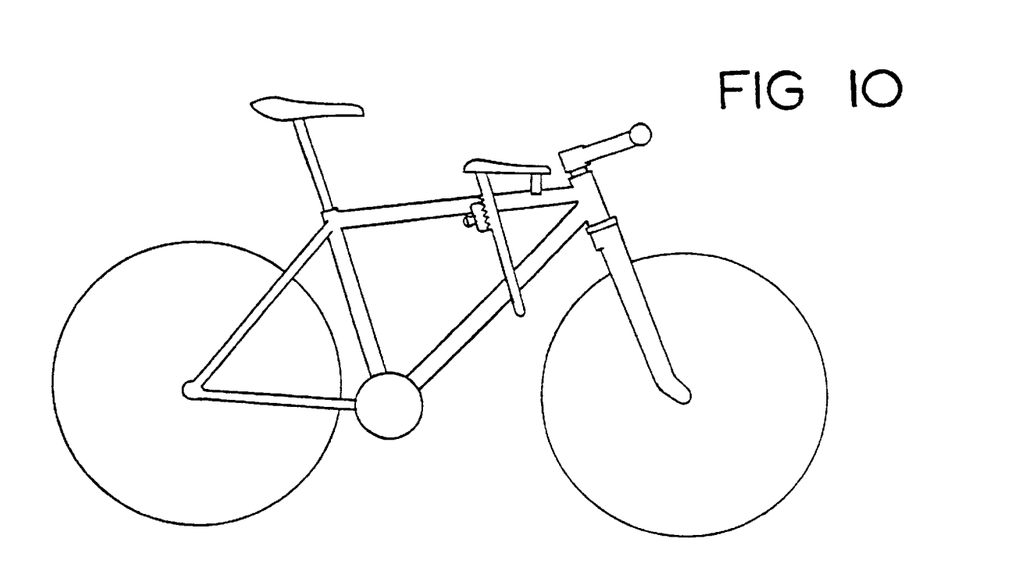
FIG. 10 shows a mountain bicycle.
Figure 11:
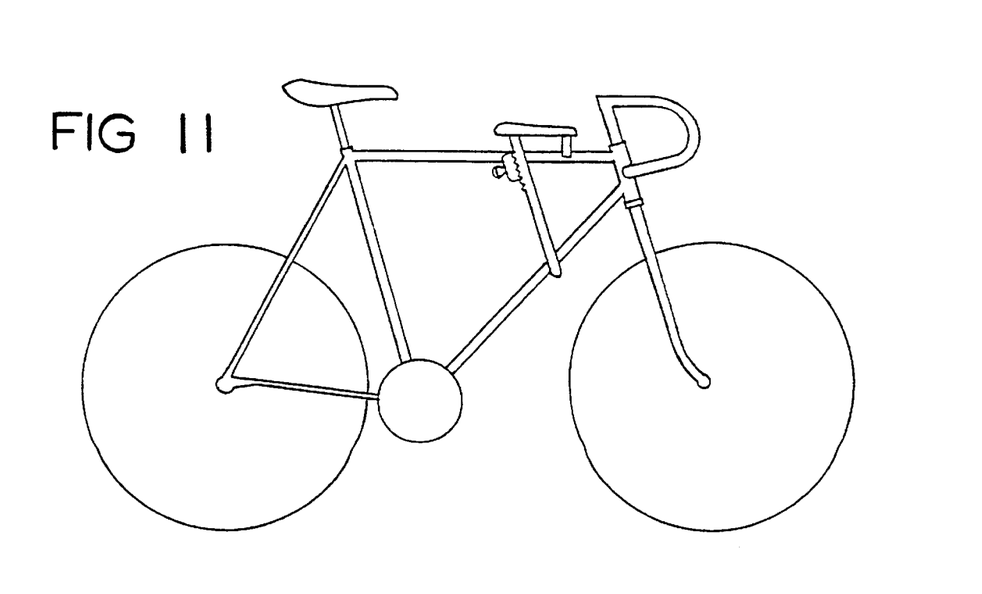
FIG. 11 shows a standard road bicycle.
Figure 12:
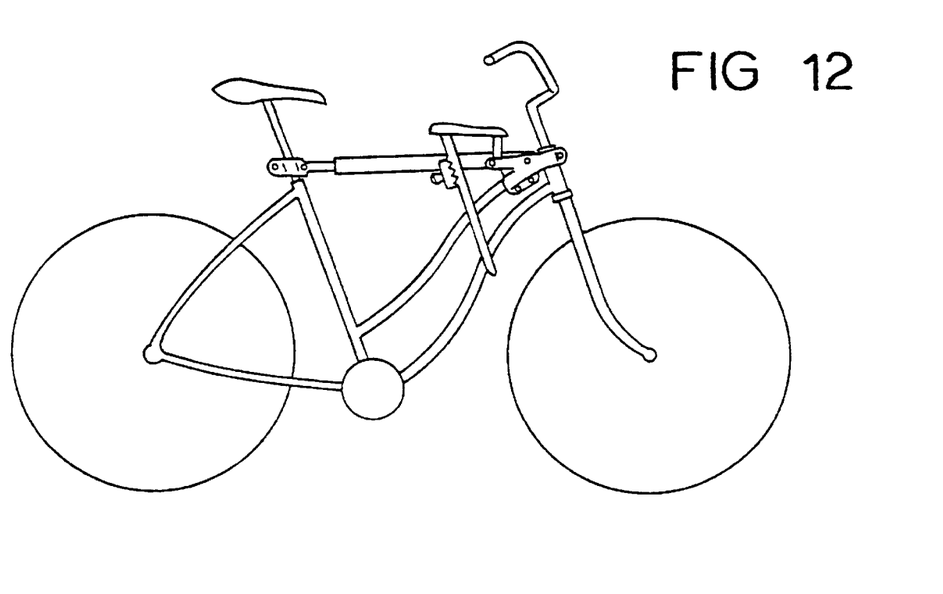
FIG. 12 depicts a typically female bicycle.
Figure 13:
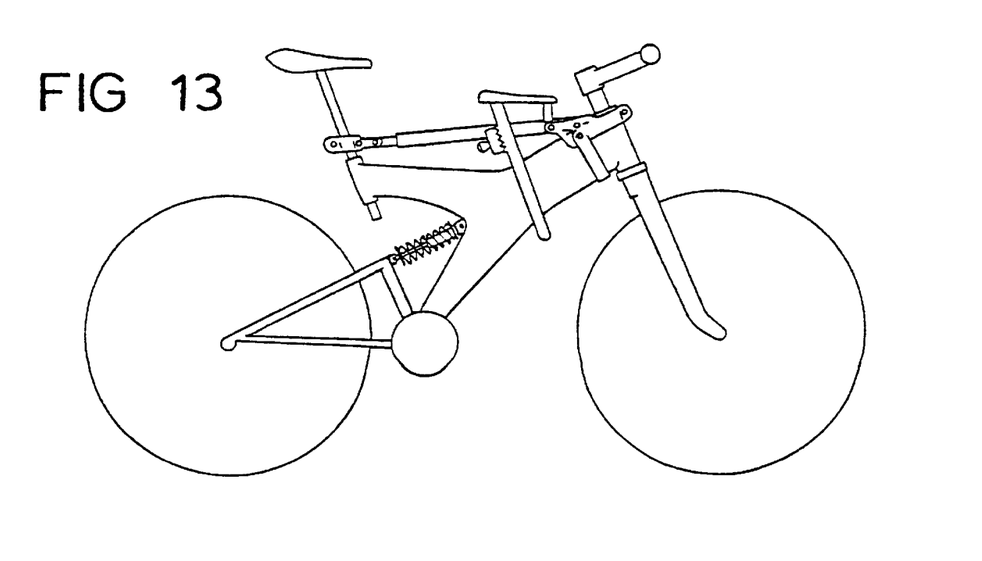
FIG. 13 represents a high-tech fiberglass bicycle.

The auxiliary seat when mounted to various bicycle designs will have the general appearance as depicted in FIGS. 10 through 13. FIG. 10 depicts a typical mountain bicycle in which the upper structural support bar is deviated slightly from the horizontal and would thus require use of insert 34. FIG. 11 depicts a typical road bicycle having a near horizontal upper structural support bar in which case the auxiliary seat would not require insert 34. FIG. 12 depicts a typical woman's style bicycle having upper structural support bars which deviate sharply from the horizontal thus requiring use of telescoping bar 70. FIG. 13 depicts a high-tech bicycle design also requiring use of telescoping bar 70.

Figure 14:
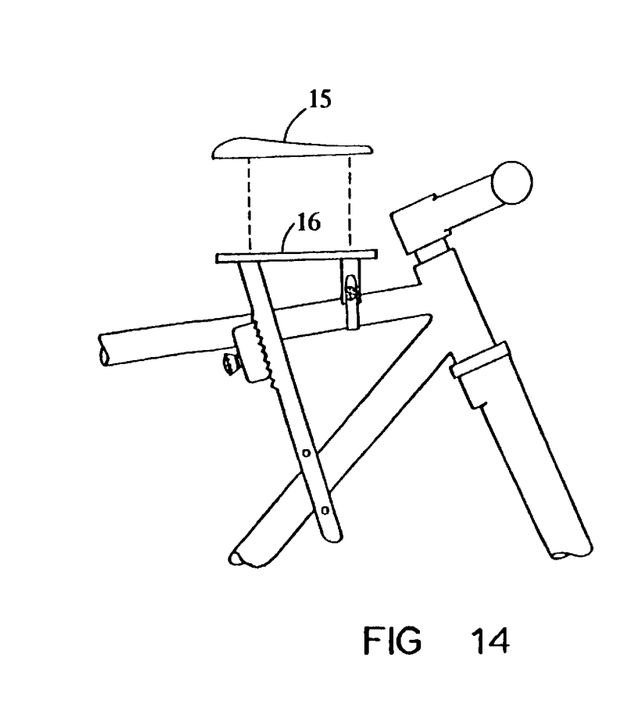
FIG. 14 is a side view of the invention and bicycle depicting the removal of the typical seat from the seat support.
Figure 15:
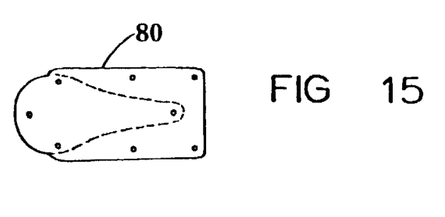
FIG. 15 is a plan view of a platform which may be mounted on top of the seat support which outline is depicted by the dashed line.
Figure 16:
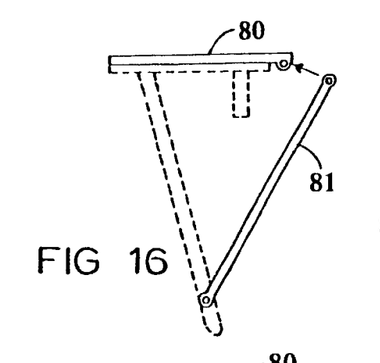
FIG. 16 is a side view of one embodiment of the invention wherein a platform such as that depicted in FIG. 15 is mounted to the seat support and bifurcated forward supports are connected to the rear support legs and the front section of the platform as shown in FIG. 18.
Figure 17:
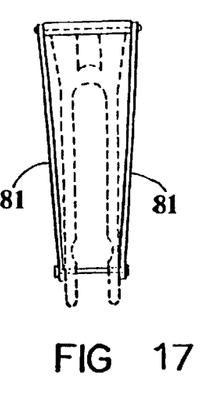
FIG. 17 is a front view of the embodiment of FIG. 16.
Figure 18:
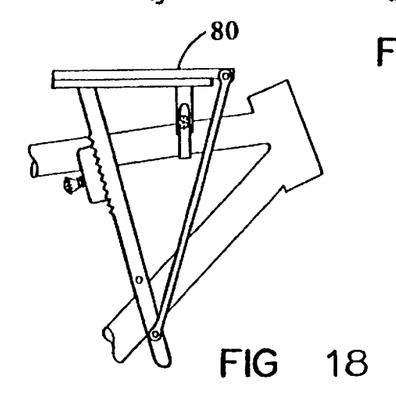

In yet further embodiments of the invention, the auxiliary seat may be designed so as to support bulky materials such as a toddlers seat or inanimate objects of dense mass such as a tool box. FIG. 14 illustrates that the seat cushion 15 is removably attached to seat support 16. Once the seat cushion 15 is removed, platform 80 may be connected to seat support 16 by any reasonable attachment means including screws, bolts, or clamps. Since the platform 80 is of greater size than the seat cushion 15, the platform may be further stabilized by connecting thereto forward support rods 81 from the forward end of platform 80 by such as screws or bolts and at the lower end of the rods to rear legs 29 by utilizing channel 38 and threaded channel 39 located at the distal end of the legs 29. Once platform 80 and forward support rods 81 are mounted, the auxiliary seat will have the appearance as shown in FIG. 18.

Figure 19:
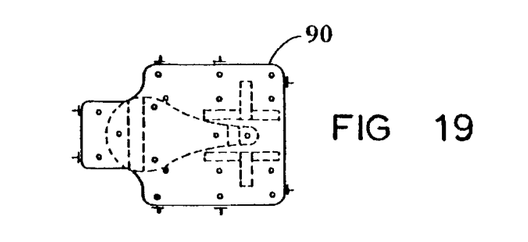
FIG. 19 is a plan view of a third embodiment of the invention wherein a large platform is mounted to the seat support.
Figure 20:
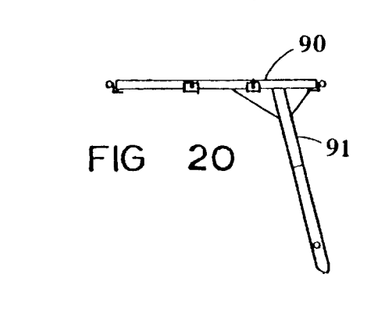
FIGS. 20 and 21 are side and front views respectively of the embodiment depicted in FIG. 19 showing a platform having forward bifurcated leg supports.
Figure 21:
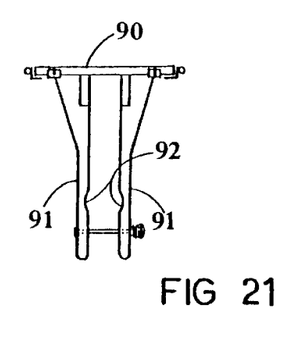
Figure 22:
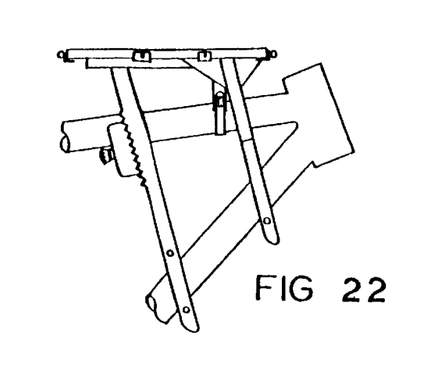
FIG. 22 show the embodiment of FIGS. 19 to 21 attached to a bicycle frame.

In still a further embodiment of the invention wherein a more substantial platform is to be used, FIG. 19 depicts a plan view of platform 90 having connected thereto two forward support braces 91 each of which include arcuate receiving means 92 for embracing a forward portion of a bicycle's lower support bar. The forward support braces 91 may be held in place by lateral compression tension means similar to that of the rear support braces. When properly mounted as shown in FIG. 22, platform 90 is connected to seat support 16 and the forward support braces 91 straddle the upper and lower bicycle support bars in the fashion of the rear legs 29.

It thus is seen that an auxiliary seat, serving as a child's seat, or other purposed platform, is now provided for a bicycle which is of relatively simple yet secure configuration and which can be readily mounted to bicycles having bars of various sizes and specific bar orientations. Preferably, it is made of plastic materials. An adjustable seat belt may also be attached to the under side of the seat support 16, just behind the rear of the rear support brace with a plurality of screws or the like. Additionally, straps may be attached to each stirrup to hold the child's feet affixed in the stirrups.

Once the auxiliary seat is mounted to the bicycle it is totally stable and secure from any movement forward or backward, up or down, or laterally left to right or to any efforts of torsion or twisting. The child, with helmet, sitting on this child seat with seat belt and foot straps in place, is indeed exceptionally secure. In addition, the child is cradled by the arms of the cyclist and yet has a good view of the road. The child may grasp onto the handle bars and will learn to participate in balance, steering, shifting gears, road etiquette and safety. Conversation is easy with the child's ears just in front of the operator's mouth. The child is not only circumscribed by the cyclist's arms but is just above but out of the way of the cyclist's thighs.

Although the invention has been specifically shown and described in it's preferred form, it should be understood that any modifications, additions and deletions may be made thereto without departure from the spirit and scope of the invention as set forth in the following claims.

I claim:

1. An auxiliary bicycle seat for a bicycle intended to be placed between a bicycle's seat post and head tube comprising:

a) a platform for supporting an object;

b) a forward seat support brace, said forward seat support brace having an upper end connected to said platform and a lower end having a concave arcuate shape with means to secure said lower end to a generally horizontal support bar; and c) a rearward seat support brace, said rearward seat support brace comprising at least two spaced apart elongated struts having an upper end and a lower end, said upper end connected to said platform, said elongated struts further having a length sufficient to extend below an upper and a lower bicycle structural support bars connecting said seat post and said head tube.

2. An auxiliary bicycle seat for a bicycle intended to be placed between a bicycle's seat post and head tube comprising:

a) a platform for supporting an object;

b) a forward support brace, said forward support brace having an upper end connected to said platform and a lower end having a means to secure said lower end to a generally horizontal support bar; and c) a rearward support brace, said rearward support brace comprising at least two spaced apart elongated struts having an upper end and a lower end, said upper end connected to said platform, said elongated struts further having a length sufficient to extend below an upper and a lower bicycle structural support bars connecting said seat post and said head tube.

3. An auxiliary bicycle seat of claim 2 wherein said platform will accommodate a child of a weight up to sixty pounds.

4. An auxiliary bicycle seat of claim 2 wherein said platform will accommodate an animal.

5. An auxiliary bicycle seat of claim 2 wherein said platform will accommodate an inanimate object having a volume up to two and one half cubic feet.

6. An auxiliary bicycle seat of claim 2 wherein said spaced apart elongated struts have at least one pair of opposing fixed concave arcuate indentations for accommodating said lower bicycle structural support bar.

7. An auxiliary bicycle seat of claim 2 wherein said spaced apart elongated struts have adjustable concave arcuate indentations for accommodating said lower bicycle structural support bar.

8. An auxiliary bicycle seat of claim 2 wherein said spaced apart elongated struts include a means near said lower end for creating lateral compression tension of said elongated struts towards one another.

9. A means for creating lateral compression tension according to claim 8 selected from the group consisting of a screw, a bolt, a clamp, and a resilient band.

10. An auxiliary bicycle seat of claim 2 or 9 wherein said platform includes foot stirrups removably attached to said spaced apart elongated struts.

11. An auxiliary bicycle seat of claim 1 or 2 able to accommodate bicycle designs selected from the group consisting of a road bicycle, a mountain bicycle, a men's bicycle, and a woman's bicycle.

12. An auxiliary bicycle seat of claim 2 wherein said forward and rearward support braces have cable channels to accommodate bicycle gear cables.

13. An auxiliary bicycle seat for a bicycle intended to be placed between a bicycle's seat post and head tube comprising:

a) a platform for supporting an object;

b) a forward seat support brace, said forward seat support brace having an upper end and a lower end, said upper end connected to said platform, said lower end having a means to secure said lower end to a generally horizontal support bar;

c) a rearward seat support brace, said rearward seat support brace comprising at least two spaced apart elongated struts having an upper end and a lower end, said upper end connected to said platform, said elongated struts further having a length sufficient to extend below an upper and a lower bicycle structural support bars which connect said seat post and said head tube; and d) a telescoping seat support rod, said support rod having a front end and a back end, said front end removably connected to said head tube, said back end removably attached to said bicycle's seat post.

14. An auxiliary bicycle seat of claim 13 wherein said platform will accommodate a child of a weight up to sixty pounds.

15. An auxiliary bicycle seat of claim 13 wherein said platform will accommodate an animal.

16. An auxiliary bicycle seat of claim 13 wherein said platform will accommodate an inanimate object having a volume up to two and one half cubic feet.

17. An auxiliary bicycle seat of claim 13 wherein said spaced apart elongated struts have at least one pair of opposing fixed concave arcuate indentations for accommodating said lower bicycle structural support bar.

18. An auxiliary bicycle seat of claim 13 wherein said spaced apart elongated struts have opposing adjustable concave arcuate indentations for accommodating said lower bicycle structural support bar.

19. An auxiliary bicycle seat of claim 13 wherein said spaced apart elongated struts include a means near said lower end for creating lateral compression tension of said elongated struts towards one another.

20. A means for creating lateral compression tension according to claim 19 selected from the group consisting of a screw, a bolt, a clamp, and a resilient band.

21. An auxiliary bicycle seat of claim 13 or 20 wherein said platform includes foot stirrups removably attached to said spaced apart elongated struts.

22. An auxiliary bicycle seat of claim 13 able to accommodate bicycle designs selected from the group consisting of a road bicycle, a mountain bicycle, a men's bicycle, and a woman's bicycle.

23. An auxiliary bicycle seat of claim 13 wherein said forward and rearward support braces have cable channels to accommodate bicycle gear cables.

24. An auxiliary bicycle seat for a bicycle intended to be placed between a bicycle's seat post and head tube comprising:

a) a platform for supporting an object;

b) a forward seat support brace, said forward seat support brace comprising at least two spaced apart elongated struts having an upper end and a lower end, said upper end connected to said platform, said elongated struts further having a length sufficient to extend below an upper and a lower bicycle structural support bars connecting said seat post and said head tube; and c) a rearward seat support brace, said rearward seat support brace comprising at least two spaced apart elongated struts having an upper end and a lower end, said upper end connected to said platform, said elongated struts further having a length sufficient to extend below an upper and a lower bicycle structural support bars connecting said seat post and said head tube.

25. An auxiliary bicycle seat of claim 24 wherein said platform will accommodate a child of a weight up to sixty pounds.

26. An auxiliary bicycle seat of claim 24 wherein said platform will accommodate an animal.

27. An auxiliary bicycle seat of claim 24 wherein said platform will accommodate an inanimate object having a volume up to two and one half cubic feet.

28. An auxiliary bicycle seat of claim 24 wherein said spaced apart elongated struts of said forward and rearward se at support braces each have at leas t one pair of opposing fixed concave arcuate indentations for accommodating said lower bicycle structural support bar.

29. An auxiliary bicycle seat of claim 24 wherein said spaced apart elongated struts have adjustable concave arcuate indentations for accommodating said lower bicycle structural support bar.

30. An auxiliary bicycle seat of claim 24 wherein said forward and rearward seat support brace spaced apart elongated struts include a means near said lower end for creating lateral compression tension of said elongated struts towards one another.

31. A means for creating lateral compression tension according to claim 30 selected from the group consisting of a screw, a bolt, a clamp, and a resilient band.

32. An auxiliary bicycle seat of claim 24 or 31 wherein said seat includes foot stirrups removably attached to said spaced apart elongated struts.

33. An auxiliary bicycle seat of claim 24 able to accommodate bicycle designs selected from the group consisting of a road bicycle, a mountain bicycle, a men's bicycle, and a woman's bicycle.

34. An auxiliary bicycle seat of claim 24 wherein said forward and rearward support braces have cable channels to accommodate bicycle gear cables.

* * * * *